Aug. 15, 1967

D. A. WALLACE 3,335,958

IRRIGATING DEVICE

Filed Oct. 11, 1965

INVENTOR.
David A. Wallace
BY
Carnes, Dickey·Pierce
ATTORNEYS

Aug. 15, 1967  D. A. WALLACE  3,335,958
IRRIGATING DEVICE

Filed Oct. 11, 1965  6 Sheets-Sheet 2

INVENTOR.
David A. Wallace
BY
Harness, Dickey & Pierce
ATTORNEYS

United States Patent Office 3,335,958
Patented Aug. 15, 1967

3,335,958
IRRIGATING DEVICE
David A. Wallace, 100 Lewiston, Grosse Pointe
Farms, Mich. 48236
Filed Oct. 11, 1965, Ser. No. 494,828
10 Claims. (Cl. 239—177)

ABSTRACT OF THE DISCLOSURE

An ambulatory irrigating device including a pipe made up of a large number of pipe sections fitted in end-to-end relationship to distribute water over a large expanse of land. The pipe is supported at one end by a rotary stand pipe and at its other end by a drive unit having ground engaging wheels. Intermediate sets of supporting wheels may be used, if desired. The pipe sections are held in assembly and under a compressive load by a pair of cables which extend between the opposite ends of the pipe and hold the pipe in an upwardly bowed condition. By this means the pipe is prevented from collapsing under the weight of the water carried thereby. The cables also transmit movement from the drive unit to the pipe and prevent excessive bowing of the pipe in a horizontal plane.

---

This invention relates to irrigation devices and particularly to a self-propelled irrigating device adapted to sprinkle water over a substantial area of ground.

The delivery of water to agricultural crops by human effort has been of increasing interest to farmers. Particularly, increasing use is being made of irrigating equipment in which water is delivered through pipes to sprinklers. Such devices use much less water than ditch or trough irrigation and have various other advantages. However, sprinkler irrigation devices have suffered from numerous problems. Permanently installed devices require extensive transverse pipes, they interfere with crop cultivation, and they are expensive. Such portable devices as have been available are of extremely complex, heavy, and expensive design and they are difficult to maintain. In my prior copending application, Ser. No. 413,747, filed Nov. 25, 1964, now United States Patent No. 3,259,315 I have disclosed an ambulant irrigating device of the type in which an overhead horizontal pipe is caused to rotate about a central vertical water supply pipe from which it receives water which it delivers to sprinkler heads mounted at spaced locations along the length thereof. The present application discloses various structural modifications and/or improvements in the construction shown in my prior copending case.

The main objects of the present invention are to provide a mobile irrigating device which is of relatively light weight and superior structural strength, to provide a mobile irrigating device which is capable of distributing water over extensive areas of crops, to provide a mobile irrigating device which is propelled by a continuous drive mechanism receiving its power from the water being distributed, to provide a mobile irrigating device which is easily assembled, to provide a mobile irrigating device which may be operated inexpensively, to provide a mobile irrigating device which possesses substantial rigidity against sagging under the weight of the water it carries, and to provide a mobile irrigating device which is able to accommodate substantial undulations or irregularities in the terrain on which it is used.

It is another object of the present invention to provide an irrigating device which may be readily transported from one field to another, which requires little or no human attention during its use, which may be used for the delivery of liquid fertilizers to crops and which is of such extreme practicality as to render feasible the hydroponic cultivation of crops on a large scale in ground having practically no inherent nutritional value and receiving submarginal natural precipitation during the growing season.

These and other objects of the invention will be apparent from the following detailed description taken in conjunction with the accompanying drawings, wherein:

FIG. 5 is a plan view of the structure illustrated in FIG. 6;

FIG. 6 is an enlarged sectional view of the structure illustrated in FIG. 1, taken along the line 6—6 thereof;

FIG. 10 is an fragmentary enlarged view of the structure illustrated in FIG. 1 looking in the direction of the arrow 10 thereof;

FIG. 14 is an enlarged view of the structure within the circle 14 of FIG. 4.

The present invention is particularly distinguished by the structure through which a plurality of horizontally extending pipe sections are maintained in end to end assembled relationship over a substantial length and in a manner preventing undue sagging or twisting of the structure under the weight of the water carried thereby or as a result of other forces imposed upon it.

Figure 1:
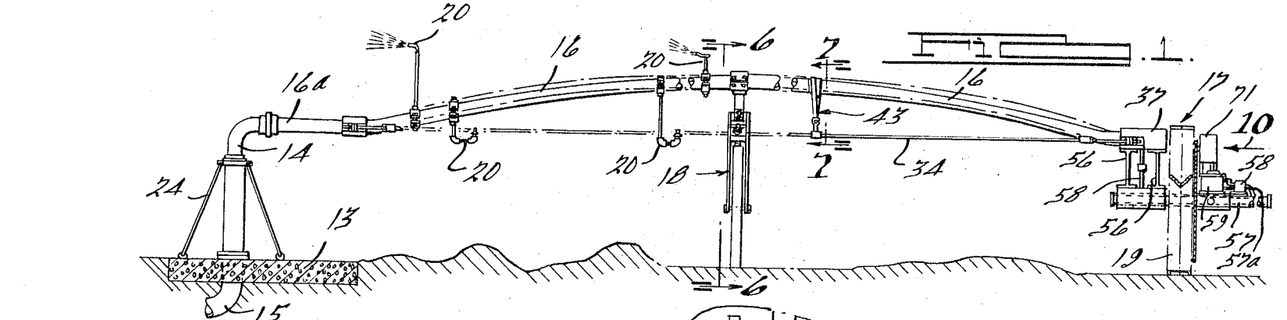
FIGURE 1 is a broken elevational view of an irrigating device according to the present invention.
Figure 2:
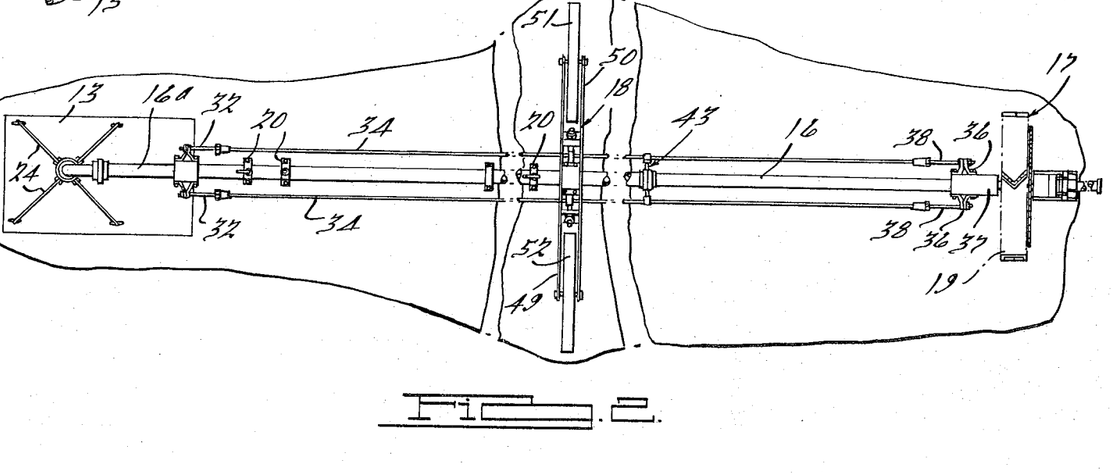
FIG. 2 is a broken plan view of the structure illustrated in FIG. 1.

Referring now to the drawings and particularly to FIGS. 1 and 2, the irrigating device of the present invention is illustrated as employing a permanent mounting pad or concrete foundation 13 which supports a vertical water supply pipe 14 through which water flows from a pipe 15. The pipe 15 is adapted to receive its water from a well pump (not shown) or other suitable water source. The pipe 14 is L-shaped at its upper end and is connected to a generally horizontal water distributing pipe 16 made up of a plurality of pipe sections 16a connected in end-to-end relation. The pipe 16 is supported at its end opposite from the vertical pipe 14 by a combination drive and support mechanism indicated generally at 17. The irrigating device is illustrated as having an intermediate ground engaging support, indicated generally at 18. The intermediate support 18 is used where the length and weight of the device and the other circumstances require, although it is possible to use an irrigating device of the present invention in which no intermediate ground engaging support is utilized between the vertical supply pipe 14 and the combination drive and support mechanism 17. The support and drive mechanism 17 derives its motive power from the pressure of the water in the pipe 16 to produce rotation of a ground engaging wheel 19 which follows a circular path generated about the axis of the vertical pipe 14. A plurality of sprinkler heads 20, which may be of various configurations, are spaced along the length of the pipe 16 to relatively evenly distribute water over the circular area described by the path of the wheel 19.

Figures 2, 3, 4:
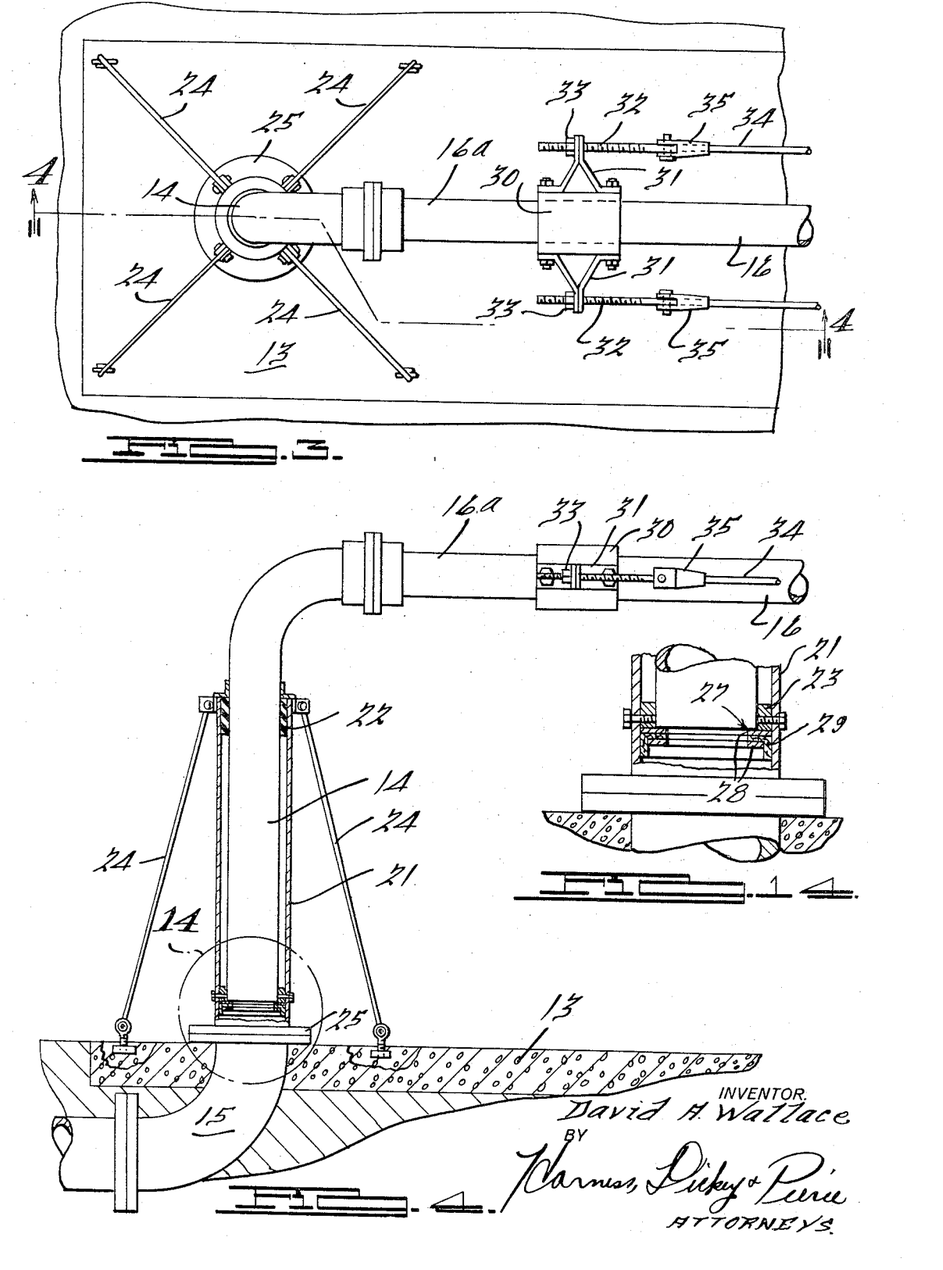
FIG. 3 is an enlarged view of a portion of the structure illustrated in FIG. 2.
FIG. 4 is a sectional view of the structure of FIG. 3, taken along the line 4—4 thereof.

Referring now to FIGURES 3 and 4, it will be seen that the pipe 14 is supported for rotation about its axis by a vertical sleeve 21 surrounding the pipe 14 and carrying an internal rubber-bearing-bushing 22 at its upper end and an annular packing 23 at its lowest end. If desired, graphite may be supplied to the exterior surface of the pipe 14 in the areas of the bushing 22 and packing 23 to reduce the friction. A plurality of supporting struts 24 extend between the upper end of the sleeve 21 and the mounting pad 13 for the purpose of supporting the sleeve 21 at its upper end. The lower end of the sleeve 21 in integrally formed with a flange 25 joined to a similar flange of the pipe 15 which is cast into the pad 13. As will be seen in detail in FIG. 14, the lower end of the vertical pipe 14 is engageable with a pressure responsive support or apertured piston assembly, generally indicated at 27. The support 27 includes a pair of metal washers 28 disposed on opposite sides of a leather cup 29. The support 27 is slidable and rotatable in the sleeve 21 and its upward movement is restrained by the packing 23 which is fixed to the sleeve 21. The upward flow of water from the pipe 15 to the vertical pipe 14 acts against the lower side of the assembly 27 and effectively supports the pipe 14 on a column of water. This substantially decreases the frictional losses at the sleeve 21 which would otherwise tend to resist rotation of the structure.

The pipe section 16a at the end of the pipe 16 adjacent to the vertical pipe 14 is provided with a pair of mounting brackets 31 projecting horizontally outwardly from opposite sides thereof. The brackets 31 are mounted on the end pipe section 16a by attachment to a sleeve 30 welded to said end pipe section 16a. The brackets 31 are apertured for the reception of a threaded rod 32 therethrough. A nut 33 is threaded on each rod 32 and bears against its adjacent bracket 31. As the two nuts 33 are tightened, tension is applied to a pair of elongated tension members 34, each of which is pivotally connected to one end of one of the rods 32. It will be seen that the tension members 34 are disposed in the same horizontal plane and are parallel to one another. While a variety of different materials may be used for the tension members 34, steel cable is believed to be well suited for the purpose. It will be noted that the ends of the cables 34 are provided with suitable fittings 35 for connection to the rods 32.

Figure 8:
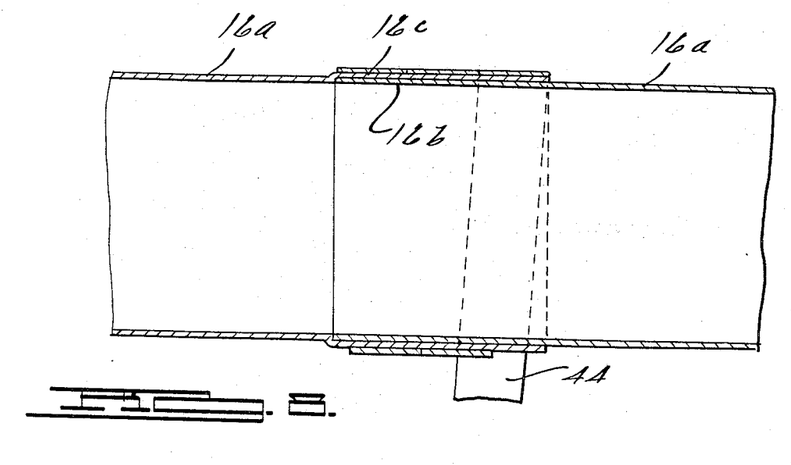
FIG. 8 is an enlarged sectional view of the structure illustrated in FIG. 7, taken along the line 8—8 thereof.

Turning now to the pipe 16, this pipe is composed of a plurality of interconnected pipe sections 16a. The pipe sections may be connected together in various suitable ways. The particular structure illustrated herein includes a terminal portion 16b formed on the end of each pipe section 16a and inserted into an enlarged diameter collar portion 16c of a next adjacent pipe section 16a. In other words, each pipe section is provided with a terminus 16b at its one end and an enlarged collar portion 16c at its other end and having an inside diameter capable of conformably accepting the terminus 16b of the next adjacent pipe section 16a. Each terminus 16b abuts the inner end of the collar portion 16c in which it is fitted for the purpose of transmitting forces longitudinally between the pipe sections 16a. It is to be appreciated that a variety of methods may be selected for joining the pipe sections 16a in end-to-end relationship for the flow of water successively therethrough and the particular interfitting construction shown in FIG. 8 merely represents one suitable construction.

The pipe sections 16a are held together in assembled interfitting end-to-end relationship by means of the cables 34. As may be seen in FIG. 2, the ends of the cable 34 opposite from the vertical pipe 14 are supported by brackets 36 projecting laterally outwardly from opposite sides of a block member 37. The cables are adjustably connected to the brackets 36 through threaded rods 38.

The threaded rods 38 may be adjusted lengthwise in a manner similar to the rods 32. The end of the pipe 16 opposite from the vertical pipe 14 is received in the block 37, which has an opening adapted to conformably receive the pipe 16. The block member 37 rests on the combination drive and support member 17. From the foregoing, it will be seen that by adjusting the rods 33 and 38 tension may be applied to the cables 34 in order to increase the compressive force or stress with which the pipe sections 16a are abutted against one another. As this force is increased, the pipe 16 is gradually bowed, as is shown in somewhat exaggerated form in FIG. 1. By this means, the pipe 16 is inclined upwardly from its opposite ends toward its midlength, where its elevation is greatest. The angle at which the pipe 16 is bowed is very slight. For example, in a pipe 16 of approximately 1,000 feet in length, the extent to which the center of the pipe 16 is elevated above the cables might be approximately 20 inches.

In view of the bowed shape of the pipe 16, the cables 34 will lie in a plane spaced beneath the pipe 16 over the major portion of the pipe's length. Fastened to the pipe 16 at its center is a fitting 39 from which depends a bar 40. A bracket 41 is slidable on the bar 40 and may be secured in any selected location along the length of the bar 40. The bracket 41 has outwardly extending arms 42 fastened to the cables 34 at their mid-length. During the initial tightening of the rods 33 and 38, the bracket 41 is left loose on the bar 41 and allowed to assume a position which is controlled by a degree of bowing of the pipe 16. When the desired amount of bow is achieved in the pipe 16, the bracket 41 is then tightened on the bar 40 in the position on the bar 40 in which it came to rest. At this point it is possible to further tighten the rods 32 and 38, in which event a secondary bow will be introduced into each half of the pipe 16, as shown in broken lines in FIG. 1. In other words, it is possible to use either a single continuous bow in the rod 16 or to produce a double bow by further tensioning of the cable 34 after the position of the bracket 41 has been set.

Figure 7:
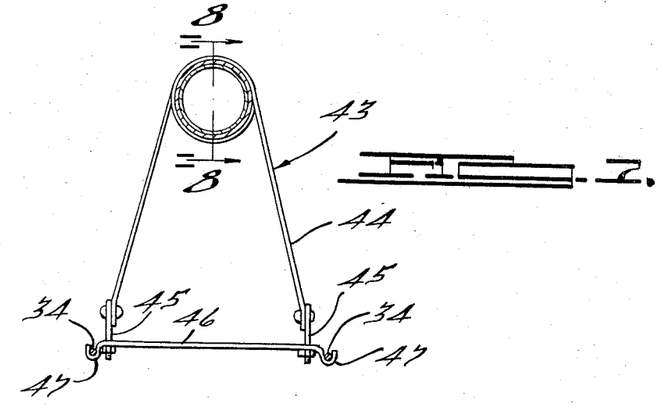
FIG. 7 is an enlarged sectional view of the structure illustrated in FIG. 1, taken along the line 7—7 thereof.

The cables 34 and the pipe 16 are further united at spaced intervals along the length thereof by means of cross brace assemblies 43, one of which is shown in FIG. 1 and in detail in FIG. 7. Although only one assembly 43 is illustrated in FIGS. 1 and 2, it is to be understood that a plurality of such assemblies are desirably employed at spaced locations along the pipe 16. Each cross brace assembly 43 will be seen to include a flexible metal strap 44 which is wrapped several times around the pipe 16 and has its opposite ends connected to a pair of fasteners 45 secured to a transverse plate 46. The plate 46 is provided with U-shaped portions 47 at its opposite ends which at least partially enclose the cables 34. The plate 46 serves to establish and maintain the horizontal spacing of the cables 34 and the straps 44 serve to prevent excessive vertical separating movements between the pipe 16 and the cables 34 in response to high stresses imparted to the pipe 16 during the operation of the irrigating device. Also, the assemblies 43 will limit the degree of bowing of the pipe 16 to permit further tightening of the rods 32 and 38 after the assemblies 43 have been installed, if such further tightening proves necessary.

From the foregoing it will be apparent that the pipe 16, cables 34, and cross brace assemblies 43 are united into a substantially rigid assembly of light weight and high structural strength. This assembly has, roughly, the configuration of the strung bow used in archery, the pipe 16 being analogous to the bow and the cables 34 being analogous to the string of the bow. When water is caused to flow through the pipe 16, it will add substantially to the weight of the assembly and will attempt to cause the pipe 16 to flex downwardly. The weight of the water is opposed by a reactive tensile loading of the cables 34 which are of sufficient structural strength to resist sagging or downward deflection of the pipe 16, and will serve to maintain the pipe 16 in its bowed shape.

The intermediate suspension assembly 18 includes the depending bar 40 and a sleeve 48 which is slidable on the bar 40 above the bracket 41. The sleeve 48 serves to pivotally support a pair of outwardly and downwardly curved arms 49 on one side thereof and a pair of outwardly and downwardly curved arms 50 on the other side thereof. The arms 49 serve to rotatably support a ground engaging wheel 51 while the arms 50 serve to support a ground engaging wheel 52. Upward pivotal movement of the arms 49 and 50 is restrained by a pair of adjustable springs 53 which are tensioned between the lower end of the bar 40 and the arms 49 and 50 at locations intermediate the wheels 51 and 52 and the sleeve 48. The arrangement permits upward movement of the wheels 51 and 52 as is shown for the wheel 52 in broken lines in FIG. 6. Accordingly, if the ground beneath the intermediate support assembly 18 fluctuates with respect to a plane extending between the pad 13 and the ground on which the wheel 19 rolls, the wheels 51 and 52 are able to adjust to such fluctuations and still support substantially the same portion of the load of the pipe 16 and the water carried therein. In this connection, the springs 53 are preferably of a relatively low rate. It is to be understood, however, that the intermediate support assembly 18 is used when necessary and there may be many installations where the weight and length of the pipe 16 does not require the use of the intermediate support assembly 18 and such assembly may be omitted.

Figure 9:
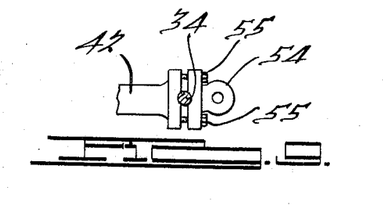
FIG. 9 is an enlarged view of the structure illustrated in the circle 9 of FIG. 6.

As shown in FIG. 9, the means of the connection of the arms 42 to the cables 34 includes a clamp member 54 which is drawn toward the arm 42 by means of bolts 55. As the bolts 55 are tightened, the cables 34 are compressed between the clamp 54 and the outer end of the arm 42.

Figures 11, 13:
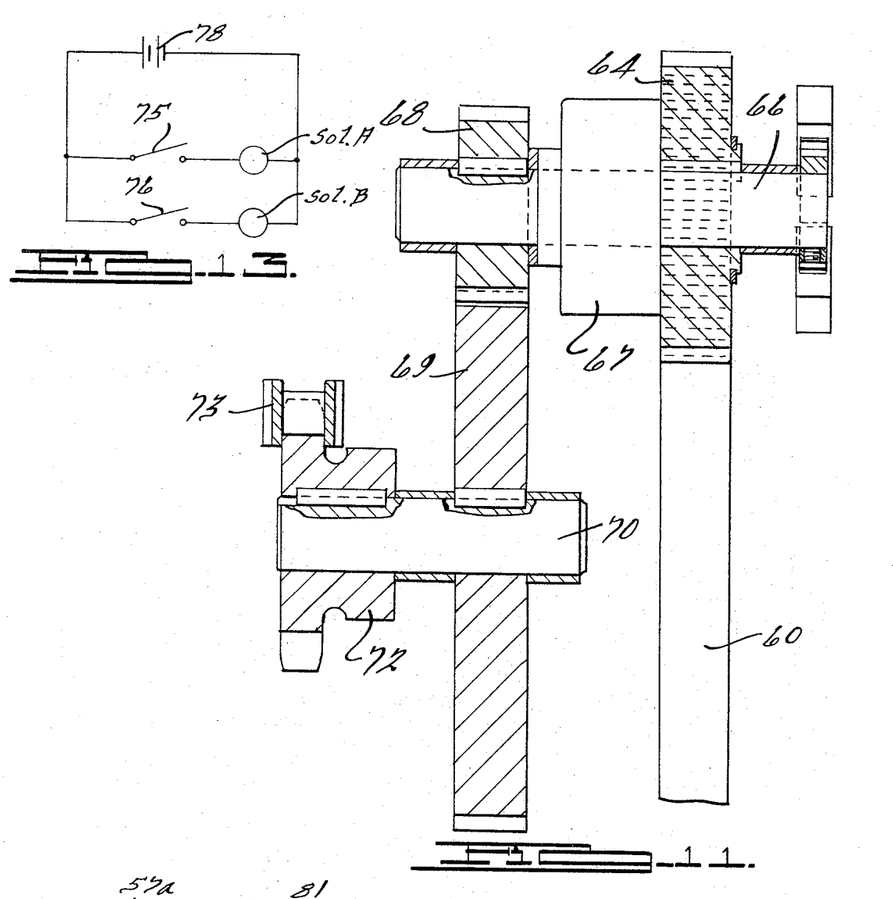
FIG. 11 is a sectional view of the structure illustrated in FIG. 10, taken along the line 11—11 thereof.
FIG. 13 is a wiring diagram for the device mechanism illustrated in FIGS. 1, 10, 11 and 12.
Figure 12:
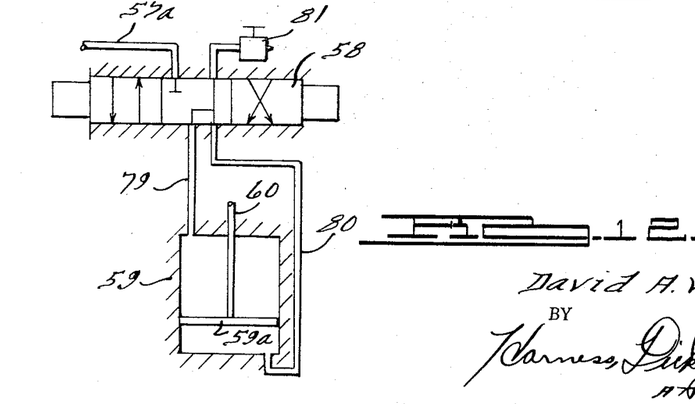
FIG. 12 is a schematic view of the hydraulic system of the structure illustrated in FIGS. 1, 10 and 11.

As shown in FIGS. 1, 10 and 11, the combination drive and support mechanism 17 includes the block member 37, which rests on support members 56 projecting upwardly from a hollow axle member 57. A water supply conduit 58 extends downwardly from the block 37 to the hollow axle 57 to supply water to the interior of the hollow axle. The axle 57 is nonrotatable and serves as a journal support for the wheel 19. Water flowing through the block 37 from the pipe 16 is carried through the axle 57 to a conduit 57a and thence to a valve 58. The valve 58 serves to control the operation of a power cylinder 59. The cylinder 59 has a piston 59a which carries a piston rod 60 having two sets of rack teeth 61 and 62 formed on opposite sides of its upper end. The rack teeth 61, 62 are separately engageable with a pair of spur gears 63 and 64 carried on shafts 65 and 66, respectively. The structure carried on shaft 65 is identical to the structure carried on shaft 66. FIG. 11 illustrates the shaft 66 and its associated structure. The spur gear 64 is shown to drive the input side of a unidirectionally acting clutch 67. The clutch 67 may be of a variety of unidirectionally or overrunning types, such as, for example, a "Formsprag" overrunning clutch. When the spur gear 64 is driven in one direction, the clutch 67 will serve to drive an output spur gear 68, but when the spur gear 64 is driven in the opposite direction no rotary motion is transmitted from the clutch 67 to the gear 68. The spur gear 68, in turn, drives a spur gear 69 mounted on a shaft 70. The several shafts 70, 65, and 66 are supported by a drive unit housing 71. The gear 69 is keyed to the shaft 70 so as to drive a sprocket 72 also keyed to the shaft 70. The sprocket 72 is engageable with a chain 73 which is welded at its one side to the drive wheel 19 and is concentric with the drive wheel 19. In a similar manner, the shaft 65 is provided with a unidirectionally acting clutch (not shown) and with a spur gear (not shown) which engages the gear 69. The clutch driven by the shaft 65, however, acts in the opposite direction from the clutch 67. Accordingly, when the clutch 67 is overrunning, rotary motion will be transmitted through the shaft 65 to the gear 69 and vice versa. Thus, when the piston rod 60 moves upwardly, the gear 69 will be driven through one of the shafts 65 or 66 and when it moves downwardly it will be driven through the other one of said shafts.

It will be seen that the shaft 66 carries a cam member 74 which is engageable with a pair of limit switches 75 and 76. These switches serve to operate a pair of solenoids, sol. A and sol. B, energized through a storage battery 78 (FIG. 13). The momentary energization of either the solenoid A or the solenoid B in response to momentary closure of the switches 75 or 76 will shift the spool of the valve 58 to reverse the flow of water to the piston 59. The piston 59 has one water conduit 79 leading from the valve 58 to its upper end and another conduit 80 leading from the valve 58 to its lower end. When the spool of the valve 58 is shifted to either position it will be held in such position by the flow of water until it is positively moved to another position by energization of a solenoid. The flow of water to the bottom of the cylinder 59 will move the piston 59a upwardly to cause the piston rod 60 to elevate. When the piston 59a reaches the top of its stroke, the other of the valves 75 or 76 will actuate to reverse the spool of the valve 58 and commence the flow of the water to the top of the piston 59 forcing the piston 59a downwardly. The water, which has previously moved the piston 59a to the position where the valve 58 reversed, is forced out of the cylinder 59, through the spool 58, and out onto the ground through an adjustable outlet valve 81. By the manual adjustment of the valve 81, the rate of flow of water through the cylinder 59 may be controlled to determine the speed at which the wheel 19 will be driven in rotation. Thus the time required for the entire unit to make one revolution may be controlled.

It is to be appreciated that the present invention is not limited to a pipe 16 of any particular size or length or to any other parts of particular dimensional sizes. Nevertheless, a statement of exemplary dimensions will help in understanding the substantial size to which the irrigation device of the present invention may be built and the amount of land which it is capable of irrigating. For example, the pipe 16 may have an external diameter of five inches and may be 1,000 feet long, thus enabling the device of the present invention to circumscribe an area having a diameter of 2,000 feet. The pipe 16 may be made of pipe sections 16a having a length of approximately thirty feet. Such a device would be capable of irrigating approximately eighty acres of land. It is possible to utilize a pump capable of delivery approximately 1,000 gallons of water per minute to the pipe 16 at a pressure of 50 to 75 pounds per square inch. The combination drive and support mechanism of such a device may be set so that the structure will make one complete revolution approximately every 72 hours. The tension members 34 may be made from 7/16 inch steel cables with each cable having a breaking strength of 25,000 to 40,000 pounds. The pipe 16 may be compressively loaded to bow at the center by an amount of approximately 10 to 30 inches above the cables 34 depending upon the length and diameter of the pipe 16. In such a unit the cross brace assemblies 43 may be placed approximately every thirty feet along the length of the pipe 16. The cables 34 may be placed approximately eighteen inches apart so that at the center of the unit the two cables 34 and the pipe 16 almost define an equilateral triangle in cross section. In an irrigating device of the foregoing dimensions the weight of the unit when filled with water would be approximately 11,000 pounds. This weight is supported between the vertical pipe 14, the drive unit 17, and the intermediate suspension unit 18. Of this weight, approximately 3,500 pounds might be desirably supported by the center suspension unit. It will, of course, be appreciated that additional suspension units of a type similar to that shown at 18 may be employed and that also additional drive wheels in addition to the drive wheel 19 of the driving support assembly 17 may be employed.

The bowing of the pipe 16 with its coincident compression, the tensioning of the cables 34, and the uniting of the cables and pipe by the cross brace assemblies 43, all combine to achieve a bridge work capable of spanning great distances with extreme rigidity. This rigidity is achieved by structure which is compact and light weight, thereby enhancing the mobility and reducing the cost of the unit. It will be seen that any torsional stresses tending to twist the pipe 16 will be effectively opposed by means of the cross brace assemblies 43.

While a pair of tension members 34 have been illustrated herein, the principles of the present invention may be achieved to some extent by utilizing a single tension member positioned immediately beneath the pipe 16. It will also be apparent that a variety of other types of tension members such as strap metal and the like may be employed in lieu of stranded cables.

While the form of the invention illustrated herein is well calculated to fulfill the objects above stated, it will be apparent that the invention is susceptible of modification, variation and change without departing from the fair meaning or scope of the subjoined claims.

What is claimed is:

1. An irrigating device including an ambulatory elongated water distributing pipe having a plurality of pipe sections arranged in end-to-end relationship and being slidably interfitted together for the flow of water successively therethrough and at least one tension member extending substantially the length of said pipe and applying a compressive load to pipe sections in a direction lengthwise thereof, said pipe being bowed upwardly above said tension member by said compressive load whereby the weight of water carried by said distributing pipe will produce an opposing tension loading of said tension member which is sufficient to maintain said pipe in an upwardly bowed condition and to hold said pipe section in assembly.

2. An irrigating device including an ambulatory elongated water distributing pipe having a plurality of pipe sections arranged in end-to-end relationship for a flow of water therethrough, a pair of generally parallel tension members extending for substantially the length of said pipe, said tension members being disposed on opposite sides of a vertical plane passing through the center of said pipe and being under tension to apply opposing forces to the opposite ends of said pipe sufficient to cause the pipe to bow upwardly above said tension members, the tension loading of said tension members being sufficient to maintain said pipe in said upwardly bowed condition under the weight of said pipe and the water carried thereby, and a ground-engaging drive mechanism operable to support at least a part of the weight of said pipe and the water carried thereby and transport said pipe over the ground, said tension members being connected to said drive mechanism to assist in transmitting motion from said drive mechanism to said pipe.

3. An irrigating device including an ambulatory elongated water distributing pipe having a plurality of pipe sections arranged in end-to-end relationship for a flow of water therethrough, abutment means at the adjacent ends of said pipe sections adapted to transmit forces longitudinally between said pipe sections, means at the opposite ends of said pipe operable to support said pipe above the ground, a plurality of sprinklers arranged at spaced locations along the length of said pipe and at least one tension member extending between the opposite ends of said pipe operable to apply opposing forces to the said ends of said pipe and hold said pipe in an upwardly bowed condition with respect to said tension member, at least one of said means at the opposite ends of said pipe comprising a ground-engaging drive mechanism operable to move over the ground and means interconnecting said tension member and said pipe at spaced locations along the length thereof to prevent separating movement between said tension member and said pipe.

4. An ambulatory irrigating device including an elongated water distributing pipe having a plurality of pipe sections arranged in end-to-end relationship for the flow of water therethrough and at least one tension member for applying opposing forces to the opposite ends of said pipe and maintaining said pipe sections in assembled relation, said tension member being tensioned sufficiently to cause said pipe to bow upwardly with respect to said tension member and a plurality of cross members extending between said pipe and said tension member at spaced intervals along the length thereof, and operable to prevent substantial vertical separating movement between said pipe and said tension member and ground engaging drive means disposed at one end of said pipe for producing rotation of said pipe about a fixed axis, said tension members being connected to said drive means to assist in transmitting motion from said drive unit to said pipe.

5. An ambulatory irrigating device including an elongated water distributing pipe having a plurality of pipe sections arranged in end-to-end relationship for a flow of water therethrough, means at the adjacent ends of said pipe sections for transmitting forces longitudinally between said pipe sections, and a pair of generally parallel tension members extending for substantially the length of said pipe applying opposing forces to said pipe at the opposite ends thereof sufficient to cause said pipe to bow upwardly with respect to said tension members, and a plurality of cross brace assemblies interconnecting said pipe and tension members at spaced locations along the lengths thereof, said cross brace members being operable to maintain a selected spacing between said tension members to prevent relative vertical separating movement between pipe and said tension members and a ground engaging drive unit connected to said pipe for producing movement of said pipe over the ground, said tension members being connected to said drive unit to assist in transmitting motion from said drive unit to said pipe.

6. An irrigating device including a vertical water supply pipe, means supporting said vertical water supply pipe for pivotal movement about a fixed vertical axis, a generally horizontally extending water distributing pipe connected to said vertical water supply pipe at one end thereof and operable to receive water from said vertical pipe, said horizontal distributing pipe comprising a plurality of pipe sections disposed in end-to-end relation for the flow of water successively therethrough, said pipe sections having means at the opposite ends thereof for transmitting forces longitudinally therebetween, at least one tension member extending for substantially the length of said pipe and operable to compressively load said pipe sections in a direction lengthwise thereof by an amount sufficient to cause said pipe to bow upwardly with respect to said tension member and a combination support and drive unit at the end of said water distributing pipe opposite from said vertical pipe operable to support said one end of said distributing pipe and to cause said distributing pipe to rotate about said vertical axis.

7. An ambulatory irrigating device including an elongated water distributing pipe having a plurality of pipe sections arranged in end-to-end relationship for the flow of water successively therethrough and at least one tension member extending substantially between the opposite ends of said pipe and applying a compressive load to said pipe sections in a direction lengthwise thereof, said tension member being tensioned sufficiently to cause said pipe to bow upwardly in substantially one continuous arc which is above said tension member and extends for substantially the entire length of said pipe, said tension member being tensioned sufficiently to maintain said pipe in said bowed condition under the weight of said pipe and the water carried thereby and a ground engaging drive unit connected to said pipe for producing movement of said pipe over the ground, said tension members being connected to said drive unit to assist in transmitting motion from said drive unit to said pipe.

8. An irrigating device including an elongated water distributing pipe having a plurality of pipe sections arranged in end-to-end relationship for the flow of water successively therethrough, means at the adjacent ends of said pipe sections for the transmission of longitudinal forces between said pipe sections and at least one tension member extending substantially the length of said pipe and operable to apply a compressive force to said pipe at the opposite ends thereof, means rigidly connecting said pipe and said tension members at a location intermediate the opposite ends thereof, said tension members being tensioned sufficiently to cause said pipe to bow upwardly in at least two separate locations on opposite sides of said last named means.

9. An irrigating device including a generally horizontally extending water distributing pipe having sprinklers connected thereto at spaced locations along the length thereof, means supporting said pipe in at least two locations, at least one of said supporting means comprising a drive mechanism having a power cylinder, a piston operable in said cylinder and a valve for controlling the operation of said piston, said valve being arranged to receive water under pressure from said pipe, a pair of rotary drive members driven in opposite directions by movement of said piston, a pair of oppositely acting unidirectional clutches each driven by one of said rotary drive members, a gear arranged to be driven alternately through two different power paths each including one of said clutches depending upon the direction of movement of said piston whereby said wheel will be continuously driven in the same direction, and means for controlling said valve to cause water to be delivered from said pipe alternately to the opposite ends of said cylinder to produce reciprocation of said piston in said cylinder.

10. An irrigating device including an elongated water distributing pipe having a plurality of pipe sections arranged in end-to-end relationship for the flow of water successively therethrough, a vertical water supply pipe operable to deliver water to said water distributing pipe and to support said water distributing pipe at one end thereof, a combination drive and support member supporting said water distributing pipe at its other end and operable to produce rotation of said water distributing pipe about said vertical pipe and an intermediate water distributing pipe support mechanism comprising a pair of ground engaging wheels on opposite sides of said water distributing pipe, and pivotal arms supporting said ground engaging wheels and spring means yieldingly opposing pivotal movement of said arms whereby said arms will pivot to maintain said wheels in engagement wtih an uneven ground surface and maintain support for said water distributing pipe at said intermediate support mechanism.

References Cited

UNITED STATES PATENTS

| 1,215,081 | 2/1917 | Todd et al. | 239—177 |
| 2,941,727 | 6/1960 | Zybach | 239—177 |
| 2,952,413 | 9/1960 | Jepson | 239—242 |
| 3,001,721 | 9/1961 | Zybach | 239—177 |

FOREIGN PATENTS

| 227,737 | 4/1960 | Australia. |

EVERETT W. KIRBY, *Primary Examiner.*